United States Patent [19]

Clegg

[11] 4,039,913
[45] Aug. 2, 1977

[54] UNIVERSAL ELECTRIC MOTOR SPEED CONTROL

[75] Inventor: John Cardwell Clegg, Provo, Utah

[73] Assignee: Battelle Development Corporation, Columbus, Ohio

[21] Appl. No.: 661,541

[22] Filed: Feb. 26, 1976

[51] Int. Cl.$^2$ .............................................. H02P 5/16
[52] U.S. Cl. ................................ 318/345 C; 318/245; 318/332
[58] Field of Search .................... 318/245, 315, 345 C, 318/345 CA, 345 G, 332

[56] References Cited

U.S. PATENT DOCUMENTS

| | | | |
|---|---|---|---|
| 3,470,437 | 9/1969 | Douglass | 318/332 X |
| 3,601,673 | 8/1971 | Mason | 318/345 C |

Primary Examiner—Herman J. Hohauser
Attorney, Agent, or Firm—Thomas W. Winland; Kenneth E. Shaweker

[57] ABSTRACT

A motor speed control system which comprises: (a) a power modulator circuit having gating means adapted to control the power supplied to the motor; (b) means adapted to provide a voltage which is directly proportional to the instantaneous motor terminal current; (c) means adapted to provide a sensing current which is directly proportional to the voltage across means (b), and thus to the instantaneous motor terminal current; (d) means adapted to provide a sensing current which is directly proportional to the instantaneous motor terminal voltage; (e) summing means adapted to algebraically sum the instantaneous values of the two sensing currents; (f) integrator means adapted to average the sum of instantaneous values provided by means (e); and, (g) feedback means adapted to generate a signal for operating the gating means, said signal having a phase determined by the output of the integrator means, whereby the output of the integrator means controls the phase of the gating means and thereby controls the power supplied to the motor.

26 Claims, 8 Drawing Figures

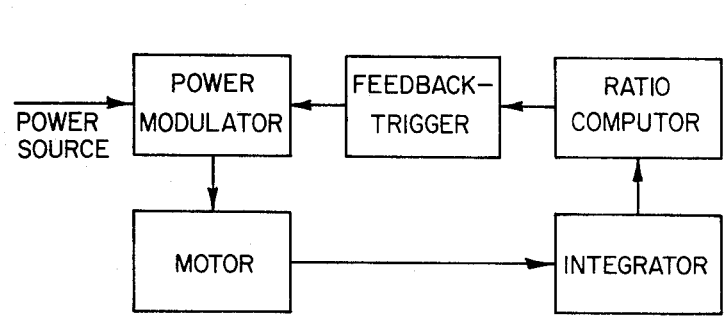
FIG. I-A
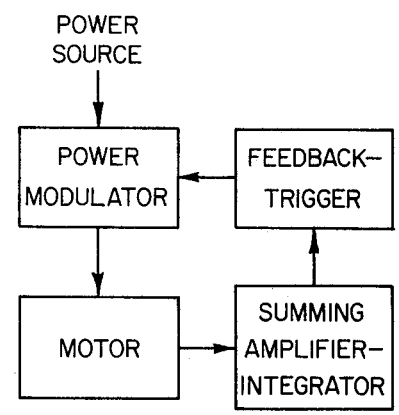
FIG. I-B
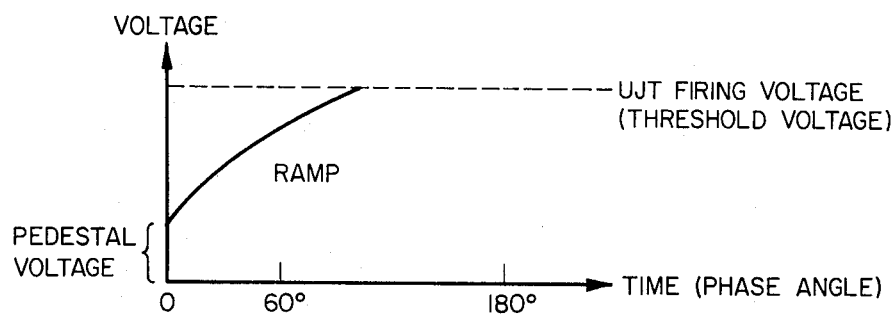
FIG. II-A
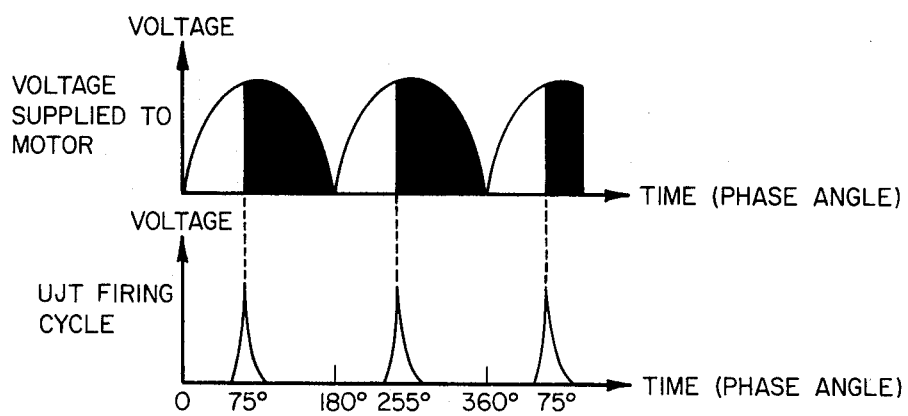
FIG. II-B
FIG. II-C
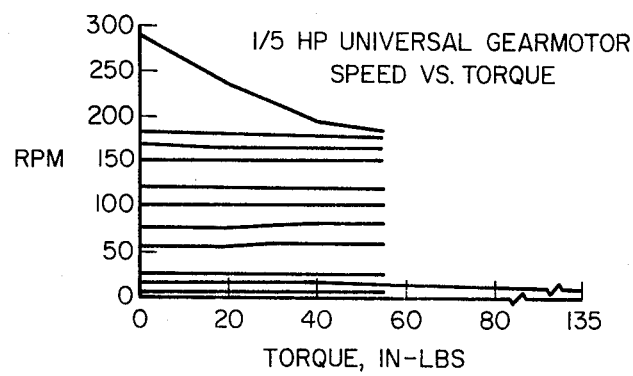
FIG. V

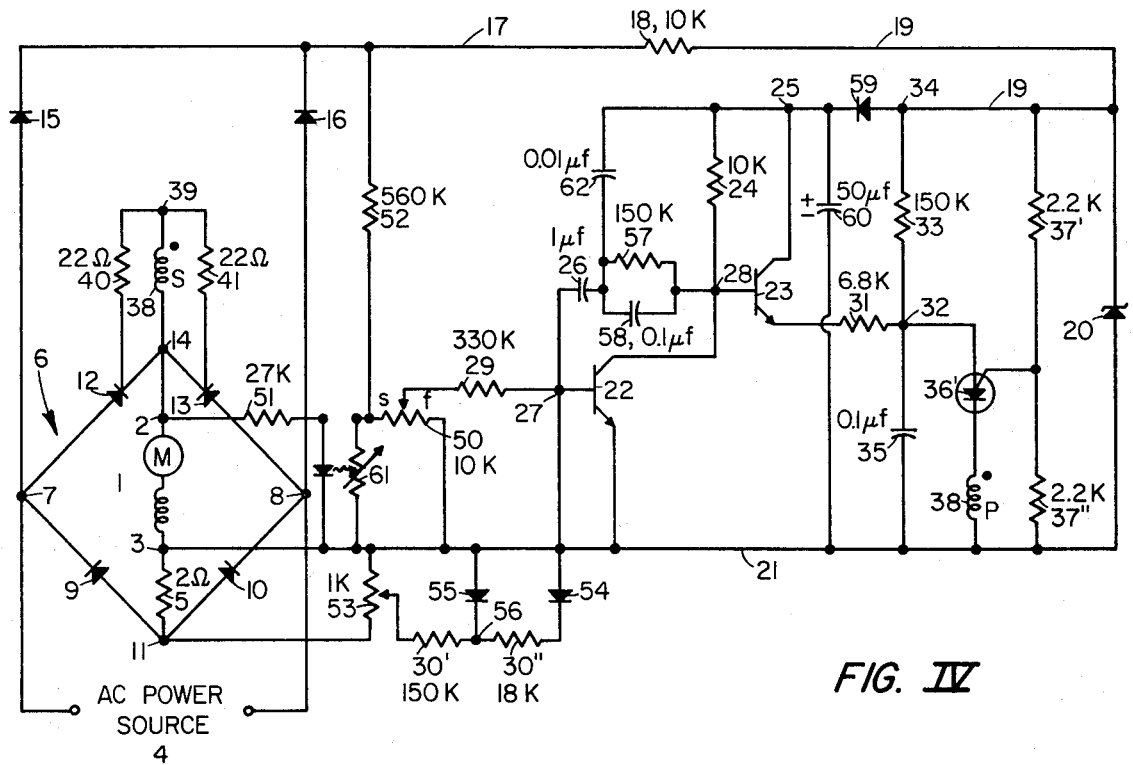
FIG. IV
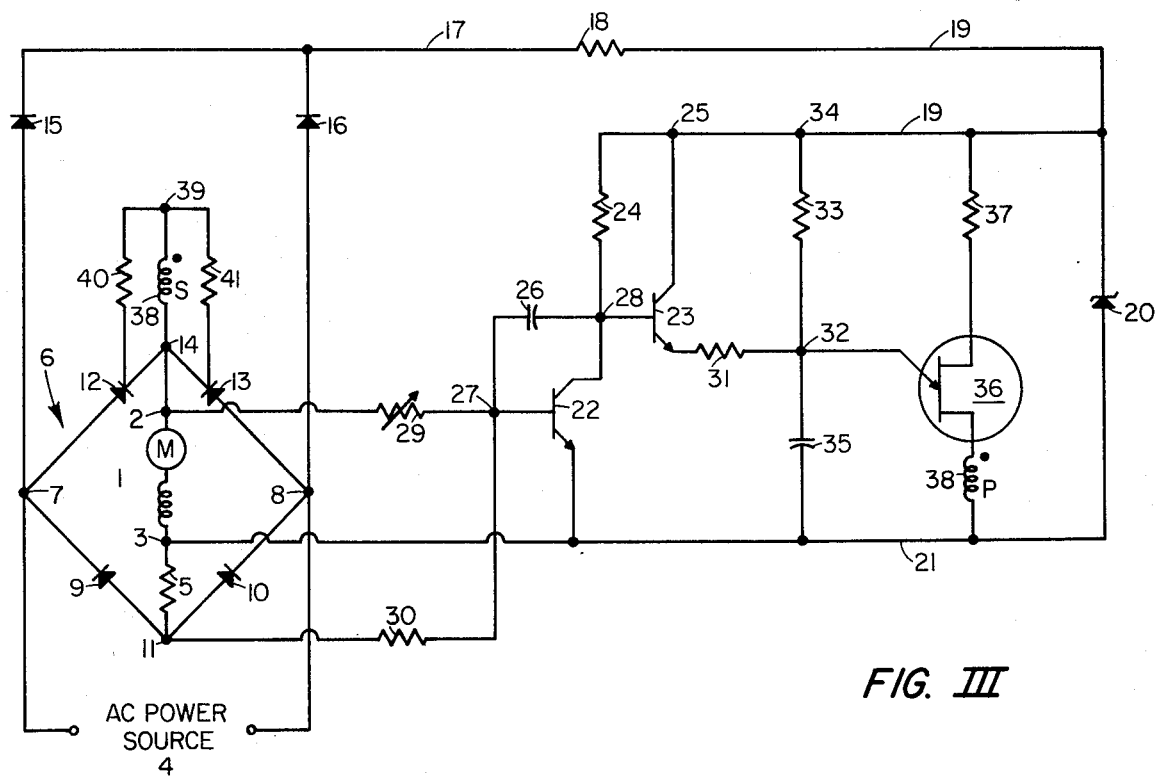
FIG. III

UNIVERSAL ELECTRIC MOTOR SPEED CONTROL

BACKGROUND OF THE INVENTION

The present invention relates to a speed control system and method for universal (series-type, a-c or d-c) electric motors.

Because of inherent wide speed fluctuations with varying load, series motors have rarely been used in automatic control systems despite their very high starting torque and their ability to function throughout an extreme range of speed. Another disadvantage of series motors has been their tendency to run at dangerously high speeds at light loads. Accordingly, it is an object of this invention to provide an improved series motor control system which will effectively eliminate speed fluctuations and prevent overspeeding. Another object of the present invention is to provide a simple, continuous (i.e., stepless), inexpensive speed control system which will permit the precise setting and maintaining of a selected speed within a wide range regardless of the necessary torque.

Typical prior art series motor speed controls are either relatively complex and expensive or, while simple and inexpensive, are of limited capability as to speed range and degree of speed regulation with load change. The latter also, when operated with a load of the type having a high starting friction and inertia, often produce an initial sudden burst of speed, rising far above the desired value. It is accordingly a further object of this invention to provide a speed control system which has a smooth starting and stopping characteristics in addition to providing full-rated torque output at slow speeds.

Another object of this invention is to provide an improved series motor speed control system which is reliable and rugged in operation, has a long operating life and is economical and convenient to operate.

Another of the primary objectives of the present invention is to extend the capabilities of universal motors with respect to starting torque and speed range, by means of a motor controller providing a high degree of regulation of speed over a wider range of loads and speed than possible with prior art devices. Other objectives are to provide a simple, inexpensive device, not requiring extra leads from the motor.

An additional object of the invention is to utilize full-wave d-c current to operate the motor. Full-wave d-c operation, compared with half-wave or a-c operation, results in improved smoothness of operation with reduced noise and vibration, higher torque capability, substantially improved efficiency, and extended motor life due to reduced peak currents and thus reduced brush and commutator erosion.

The prior art teaches numerous systems for controlling the speed of universal electric motors. For example, the most precise control systems use a separate tachometer for sensing speed, with the tachometer reading serving as input to a feedback circuit. Some prior art systems base the feedback on the motor armature voltage, which requires separate leads to be brought out from the motor to measure the voltage or requires that the motor be operated only on half wave. Other prior art systems base the feedback on the motor current, which is a useful measure of speed only for fixed loads. Neither armature voltage nor motor current is a unique function of speed independent of the applied load.

One prior art patent, U.S. Pat. No. 2,978,624 (Smith-Vaniz), teaches the use of the instantaneous ratio of motor terminal voltage to motor terminal current, i.e., the terminal impedance, in a series motor control system. The Smith-Vaniz patent uses a magnetic amplifier feedback system to sense the instantaneous values of the terminal voltage and the terminal current, which are inductively smoothed, and presents a negative output impedance to the motor of a magnitude to match the effective resistance presented by the motor at the desired speed.

The present invention provides a much more precise speed control system than the Smith-Vaniz system, as will be discussed below, and does not require the costly and bulky magnetic amplifier of Smith-Vaniz.

These, and other objects, aspects, and advantages of the present invention will be more fully understood from a consideration of the following specification and claims in conjunction with the accompanying diagrams.

SUMMARY OF THE INVENTION

A typical motor speed control system according to the present invention for controlling a universal-type motor comprises: (a) a power modulator circuit having a pair of input terminals adapted to be connected to a source of alternating current and a pair of output terminals adapted to be connected to a universal-type motor, said circuit including gating means adapted to control the power supplied to the motor; (b) means, adapted to be connected in series between the motor and one of said output terminals and adapted to provide a voltage which is directly proportional to the instantaneous motor terminal current; (c) means, connected to means (b) at said output terminal, adapted to provide a sensing current which is directly proportional to the voltage across means (b), and thus to the instantaneous motor terminal current; (d) means, adapted to be connected to the motor and adapted to provide a sensing current which is directly proportional to the instantaneous motor terminal voltage; (e) summing means, connected to means (c) and (d), adapted to algebraically sum the instantaneous values of the two sensing currents; (f) integrator means, connected to means (e), adapted to average the sum of instantaneous values provided by means (e); and, (g) feedback means, connected between integrator means (f) and said gating means and adapted to generate a signal for operating the gating means, said signal having a phase determined by the output of the integrator means, whereby the output of the integrator means controls the phase of the gating means and thereby controls the power supplied to the motor.

Typically, means (b) includes current transformer means, or, in another typical embodiment, means (b), (c), and (d) may each comprise a resistance means.

As two optional features, means (c) may typically comprise potentiometer means connected to means (b) and resistance means connected to the tap of the potentiometer, and/or means (d) may typically comprise potentiometer means adapted to be connected to the motor, and resistance means connected to the tap of the potentiometer.

In one preferred embodiment summing means (e) comprises a summing amplifier, and integrator means (f) comprises an integrating amplifier, and in a still preferred embodiment summing means (e) and integrator means (f) comprise a single summing amplifier which operates in the integrating mode.

The power modulator circuit (a) may typically comprise a controlled bridge rectifier circuit, while the controlled bridge rectifier circuit may typically comprise two thyristor means and two diode means in combination, and the two thyristor means may typically function as the gating means.

In one preferred embodiment the feedback means (g) comprises ramp-and-pedestal trigger means connected to the integrator output, said trigger means including unijunction transistor means, and pulse transformer means connected between the output of the trigger means and the gate of the gating means, wherein the ramp-and-pedestal trigger means, including the firing of the unijunction transistor, is responsive to the integrator output, and wherein the firing of the unijunction transistor means causes the generation of pulse signals by the pulse transformer, with said pulse signals serving to open the gating means into the conducting state. The system as described above may typically include resistance means connected between the gate of one thyristor means and one of the pulse transformer output terminals, and resistance means connected between the gate of another thyristor means and said output terminal, wherein said two resistance means insure proper pulse sharing between the thyristors. It is preferred that the ramp-and-pedestal trigger means be of the exponential ramp type, and it is preferred, though certainly not required, that the unijunction transistor means comprise a programmable unijunction transistor.

One preferred embodiment of the present invention includes full wave rectifier means adapted to be connected to the alternating current source, wherein said rectifier means is adapted to provide d-c voltage to means (e), (f), and (g).

Various preferred embodiments of the present invention are possible incorporating one or more of the following optional features: (1) resistance means and zener diode means connected in series to the rectifier means, wherein said resistance means and zener diode means are adapted to provide at least partially filtered and regulated d-c voltage to means (e), (f), and (g); (2) first resistance means adapted to be connected between the motor and the potentiometer (if used) and second resistance means connected between the junction of the first resistance means with the potentiometer and a rectified a-c voltage source, with the second resistance means adapted to provide a d-c bias to means (d); (3) diode means connected in series between means (c) and means (e) and adapted to provide a voltage drop to compensate for the voltage drop at the input of the summing means (e); (4) where means (c) comprises at least two resistor means, diode means connected between the junction of the two resistors and a virtual ground; (5) phase-lead means inserted in series with the integrating capacitor of integrator means (f), with the phase-lead means comprising capacitor and resistor means in parallel; (6) series diode means and parallel capacitor means inserted between said zener diode regulated supply voltage and means (e), whereby the voltage supplied to means (e) is further filtered; (7) optical isolator means functioning as means (d); and/or (8) capacitor means adapted to be connected between a d-c voltage source and the capacitor of said integrator means (f) and adapted to provide a positive transient charge to the integrator means.

A typical method according to the present invention for controlling the speed of universal-type electric motors powered through power modulator means having gating means adapted to control the power supplied, comprises: (a) providing a sensing current directly proportional to the instantaneous motor terminal current; (b) providing a sensing current directly proportional to the instantaneous motor terminal voltage; (c) averaging the instantaneous values of the two sensing currents; (d) measuring the ratio of average motor terminal voltage to average motor terminal current using the averages obtained in step (c); (e) generating a negative feedback signal adapted to open the gating means of the power modulator, wherein the negative feedback signal has a phase determined by the value of the ratio obtained in step (d), whereby the value of the ratio controls the phase of the gating means and thereby controls the power supplied to the motor.

Another typical method according to the present invention for controlling the speed of universal-type electric motors powered through power modulator means having gating means adapted to control the power supplied, comprises: (a) providing a sensing current directly proportional to the instantaneous motor terminal current; (b) providing a sensing current directly proportional to the instantaneous motor terminal voltage; (c) algebraically summing the instantaneous values of the two sensing currents; (d) averaging the sum of instantaneous values obtained in step (c); (e) generating a negative feedback signal adapted to operate the gating means of the power modulator, wherein the negative feedback signal has its phase determined by the magnitude of the average obtained in step (d), whereby the magnitude of the average controls the phase of the gating means and thereby controls the power supplied to the motor. The above-described method typically includes providing gain compensation to the feedback signal, whereby any excessive feedback signal is corrected.

DRAWINGS

FIGS. I-A and I-B are block diagrams illustrating two embodiments of the present invention.

FIG. II-A illustrates a typical voltage-time curve for a typical ramp-and-pedestal trigger mechanism of the exponential ramp type.

FIG. II-B is a typcial voltage-time curve showing the voltage (power) supplied to a motor by a power modulator which is controlled by a unijunction transistor having the firing cycle shown in FIG. II-C.

FIG. II-C illustrates a typical unijunction transistor firing cycle.

FIG. III is a circuit diagram illustrating one embodiment of the present invention.

FIG. IV is a circuit diagram illustrating other preferred embodiments of the present invention.

FIG. V is a graph showing some significant and unexpected advantages of the present invention. PRE-

PREFERRED EMBODIMENTS

THEORY OF OPERATION

Neglecting inductance and brush voltage drop, the instantaneous terminal voltage, v, of a series motor consists of two components.

One component is the voltage drop, iR, caused by armature and field winding resistance, where i is the instantaneous motor terminal current and R is the sum of armature and field resistance.

The other (usually larger) component of terminal voltage is the back E.M.F. which is proportional to the rotational speed, $\omega$, and to field flux, $\phi$. These ideas are summarized in Equation 1.

$$v = iR + K' \omega \phi \quad (1)$$

where K' is a proportionality constant.

The field flux is approximately proportional to the terminal current, $i$ $$\phi \simeq K''i \quad (2)$$

Substituting this into Equation 1; and letting K' K" = K, gives $$v \simeq iR + k' \omega k'' i \simeq (R + k\omega) i. \quad (3)$$

This may be written $$v/i \simeq R + K\omega, \quad (4)$$

which states that the instantaneous terminal impedance, $v/i$, is a unique function of speed, since R is constant except for a slight temperature variation.

If $v$ is derived from an a-c or d-c power source through the chopping action of thyristors or other gating or switching elements, the inductance cannot be neglected. At the time when the thyristor turns on (as it does each half-cycle of the a-c supply voltage), the voltage may be high but the current may be zero. As time progresses the current builds up in the inductive windings and continues to flow after the voltage has gone to zero. Thus, the instantaneous terminal impedance, $v/i$, varies from infinity to zero during each half cycle because of the motor inductance neglected in the equations above. Instantaneous impedance is therefore not a suitable measure of speed if v is derived from any rapidly varying or chopped voltage.

I have found that Equation 4 is approximately true if average voltage and average current are used in place of the instantaneous values, and if the averages are taken over a period of time equal to or greater than one-half cycle time of the a-c supply. Using capital letters to designate average voltage and current, gives $$V/I \simeq R + K\omega. \quad (5)$$

Equation 5 thus states that motor speed, $\omega$, is a unique function of the ratio of average motor terminal voltage to average motor terminal current.

DETAILED DESCRIPTION OF THE INVENTION

One aspect of the present invention contemplates the direct measurement and computation of the ratio of two variables indicated in Equation 5 by conventional electronic means; however, the present invention also provides a simpler method described below.

Equation 5 may be written in the following equivalent form $$V - (R + k\omega) I \simeq O. \quad (6)$$

Here the operation of division of two variables has been replaced by a simpler operation of scaling and subtraction. This operation may be performed, for example, by algebraic summation of voltage-sensing and current-sensing currents (proportional to the two terms of Equation 6) at the summing-point input of a summing amplifier means.

Computation of averages may be accomplished, for example, by integration of instantaneous values by an integrator means.

$$\int_0^T [v - (R + k\omega)i]dt = K \quad (7)$$

Obviously the algebraic summation and integration may be performed in combination by a single means, i.e., a summing amplifier-integrator.

Equation 7 is equivalent to Equation 6. If the average value of the integrand is zero, the integral will have the same value at equivalent points in each successive half cycle. The variation of the integral within a cycle may be negligibly small, as well, so that K may be considered a constant for steady-state operating conditions. The value of K changes to a different constant if the commanded speed is changed or if the load changes, but the integrand returns to zero once the new equilibrium condition is established. A non-zero value of the integrand represents an error signal which causes the motor control system to seek the new equilibrium condition and reduce the error to zero. Obviously the actual numerical value of K is dependent on the circuit constants.

Thus, a second aspect of the invention contemplates the dual operation of algebraic summation and integration of the instantaneous motor terminal current, $i$, and voltage, $v$, with the output signal, i.e., K, serving as the input to a feedback means which generates a signal for operating the gating (or switching) means of a power modulator circuit which supplies power to the motor. The output signal, K, thereby controls the fractional conduction time of the power modulator and thereby controls the power delivered to the motor, thus maintaining the commanded motor speed. Thus, the motor voltage is controlled so that Equation 7 is satisfied. If the speed should tend to decrease because of increasing load, the motor current, and thus the negative term in Equation 7, increases and, after polarity inversion through the integrator, raises the value of K, which ultimately raises the motor voltage and causes the speed to essentially instantaneously increase as desired. When the speed has increased sufficiently, the average positive and negative components in the integrand cancel one another and K thereafter remains constant at a new value appropriate for the new load. The opposite corrective action takes place in the event of a load decrease.

This system is a Type 1 system according to accepted control system nomenclature, since an infinitesimal error between the commanded and achieved speed is integrated over a long period of time, if necessary, until a very large output voltage change is generated for corrective purposes, thereby reducing the steady-state speed error to a very small value.

As indicated in Equations 5 and 6 above, the present invention utilizes the average motor terminal voltage and average motor terminal current. Instantaneous motor voltage can be sensed at the motor terminals, while instantaneous motor current can be sensed, for example, by the voltage appearing across a resistor placed in series with one of the motor terminals, or by other means such as a current transformer or a Hall-effect transducer. Averages may typically be computed through the use of various integrator means, such as, for example, an operational amplifier operating in the integrating mode. As stated above, in the embodiments of the invention which are based on Equation 6, the integrator means may be combined with the summing means.

Feedback means driven by the integrator means, and a power modulator circuit controlled by the feedback means, and in turn controlling the power supplied to the motor, comprise necessary elements of every embodiment of the present invention. See FIGS. 1-A and I-B. Various methods of feedback pulse generation, timing, and triggering well known in the art can be employed to gate the power modulator. Likewise, various power modulators known in the art can be used to control the power supplied to the motor in response to the feedback signal. With an a-c power source, the power modulator may typically comprise a diode-thyristor bridge rectifier circuit, or other types of controlled rectifier circuits employing thyristors, thyratrons, or ignitrons. With either a-c or d-c power sources it is also possible to employ power transistors or power vacuum tubes operating in the switching mode.

FIG. 1-A illustrates the necessary elements of an embodiment of the invention based on Equation 5, i.e., direct measurement and computation of the ratio of two variables.

A power modulator means controls the voltage supplied to the universal series motor from the power source. The average output power of the power modulator is varied by control of the duty cycle, i.e., the fraction of each half-cycle of the input power during which the power modulator is conducting, with such control being provided by a feedback signal to be described below.

An integrator means integrates the instantaneous motor terminal voltage and current values, and furnishes output signals respectively equal to the average motor terminal voltage and current.

The computation of the ratio of these two averages may typically be accomplished through the use of an analog divider. The basic arithmetic process of division can be readily accomplished, using a conventional analog multiplier, by simply regarding division as multiplication by the reciprocal of the divisor. The reciprocal of a transfer function can be generated readily by inserting the input in a feedback loop within the multiplier to give the desired quotient. Other circuitry and devices are known in the art which will also compute the ratio of these two averages.

A feedback-trigger circuit translates the output of the ratio computation means into a trigger, i.e., gating, pulse which serves as the feedback signal to control the output power of the power modulator. The feedback-trigger circuit may typically comprise, for example, a variable d-c bias circuit or a ramp-and-pedestal trigger means. In a typical ramp-and-pedestal trigger mechanism the pedestal voltage determines the time, within each half cycle of the supply voltage, at which a trigger pulse is generated (typically by a unijunction transistor), with said pulse being fed back by a coupling means (typically a transformer or other similar means) to trigger, i.e., gate into the conducting state, the appropriate components of the aforementioned power modulator, and thus control the average power supplied to the motor. The feedback signal and its sign are arranged such that for any commanded speed, a change in motor terminal impedance caused by load change results in a change in the time within the period of each half-cycle during which the power modulator remains gated into the conducting state, with the change in power modulator conduction time made in the correct direction to maintain constant speed; this effect is termed negative, or inverse, feedback, and results in control of set speed over a wide range of load conditions.

FIG. I-B illustrates the necessary elements of an embodiment of the invention based on Equation 6, i.e., algebraic summation.

A power modulator means controls the voltage supplied to the universal series motor as described with reference to FIG. I-A, above.

A summing amplifier-integrator circuit, which may typically be comprised of several elements, measures, algebraically sums, and integrates the algebraic sum of instantaneous motor terminal voltage and current, and furnishes an output voltage signal whose magnitude is determined by the commanded speed of the motor and its load value. Said output signal serves as the pedestal voltage of a feedback-trigger circuit as described with reference to FIG. I-A, above.

In operation, if, for example, an increased load should be applied to the motor, tending otherwise to slow it down, the instantaneous motor terminal current will increase so that the output of the analog divider of FIG. I-A, or the output of the summing amplifier-integrator of FIG. I-B, (with the appropriate sign for negative feedback) will increase. As is shown in FIG. II-A, an increase in the pedestal voltage (i.e., the output of the analog divider or the summing amplifier-integrator) in a ramp-and-pedestal trigger mechanism results in a decrease in the time required for the increasing ramp voltage to reach a certain fixed voltage level. This fixed voltage level equals the peak voltage of a unijunction transistor or other similar triggering, i.e., "firing", device (a key element in any typical ramp-and-pedestal trigger mechanism). The decrease in the time required to reach the peak voltage causes the unijunction transistor to fire earlier in a given half-cycle, as is shown in FIG. II-C. The firing of the transistor produces a current pulse which is transferred by a pulse transformer, or other coupling means, to the power modulator. The "earlier" firing of the unijunction transistor, and consequently the earlier transmission of the gating pulse, results in the earlier gating of the power modulator into the conducting state, and thus, as is shown in FIG. II-B, results in more power (i.e., voltage) (the shaded portion) being delivered to the motor. The resulting increase in power thus compensates for the increased load so that the motor speed remains essentially constant. The opposite series of corrective actions takes place in the event of a decrease in the applied load. The changes in both motor current and voltage are precisely those required to satisfy Equation 7.

Referring to FIG. III, one embodiment of a typical control system according to the present invention comprises a circuit as follows.

The universal (series) motor 1 having terminals 2 and 3 which serve both input and output functions, is operated as a direct-current device, being energized in this particular embodiment from a suitable alternating current (a-c) source 4, such as, for example, a 60-cycle, 115-volt source, through the power modulator 6, which in this preferred embodiment comprises a controlled bridge rectifier that provides full-wave direct current (d-c) rectification of the a-c voltage. A pair of input terminals 7 and 8 are connected from the a-c source to oppostie sides of the bridge rectifier circuit.

In the bridge rectifier circuit shown, diodes 9 and 10 are connected between terminals 7 and 11 and terminals 8 and 11 respectively, and thyristors 12 and 13 are connected between terminals 7 and 14 and 8 and 14 respectively. Typically the thyristors may comprise silicon controlled rectifiers (SCRs). Obviously, other controlled rectifier or switching designs are possible, utilizing, for example, thyratrons, ignitrons, triacs, or switching transistors. Motor terminal 2 is connected directly to bridge terminal 14 while motor terminal 3 is connected, through motor current sensing resistor 5, to therminal 11. Resistor 5 serves to provide a voltage which is directly proportional to the instantaneous motor terminal current.

Another bridge circuit comprising four diodes 9, 10, 15, and 16 (diodes 9 and 10 being shared with the above-described bridge) supplies full-wave rectified a-c voltage to the integration and trigger circuits to be described below. In this circuit, diodes 15 and 16 are connected between terminal 7 and line 17 and terminal 8 and line 17 respectively. The voltage, $V_1$ supplied by line 17 is measured with respect to terminal 3 of the motor. Voltage $V_1$ is supplied to a current-limiting resistor 18, which is connected in series to reference diodes 20 (i.e., a zener diode) by line 19. Zener diode 20 is connected between lines 19 and 21. The voltage, $V_2$, across diode 20, and on line 19, is equal to the diode breakdown voltage (typically + 8 volts) except during brief instants twice each cycle when the a-c source voltage goes through zero. At these times the voltage $V_2$ also drops momentarily to zero, i.e., negative-traveling pulses. These momentary voltage drops are utilized in a manner to be described below with regard to the discharge of capacitor 35 at the end of each half-cycle.

Voltage $V_2$ supplied by current carrying line 19 provides the collector supply voltage for transistors 22 and 23 with the collector of transistor 22 being connected, through load resistor 24, to terminal 25 located on line 19 and wit the collector of transistor 23 being connected directly to terminal 25. Although momentary drops to zero of voltage $V_2$ are not desirable for operation of transistors 22 and 23, they can be tolerated here. In a preferred embodiment, voltage $V_2$ can be filtered prior to use as collector supply voltage for the transistors by the use of a filter comprising a diode (see FIG. 4) in series between terminals 25 and 34 (to be discussed below), with the cathode of the diode toward terminal 25, and a capacitor (see FIG. 4) having one terminal connected to terminal 25 and the other terminal connected to current-carrying reference line 21 (to be discussed below).

Transistor 22 is connected in combination with capacitor 26 to function as a summing amplifier and an integrator. Other methods of summing and integration to obtain a Type I control system are of course possible, although probably more complex than in the present embodiment. Capacitor 26 is connected between terminals 27 and 28. The collector of transistor 22 connects to resistor 24 through terminal 28, and the base of transistor 22 is connected to terminal 27. Terminal 27, in turn, is connected, through voltage sensing resistor 29, to motor terminal 2, and through current sensing resistor 30, to terminal 11. Resistor 30 serves to provide a sensing current which is directly proportional to the voltage across resistor 5, and therefore to the instantaneous motor terminal current. Voltage feedback through capacitor 26 causes the base voltage of transistor 22 to remain at a substantially constant value with respect to the emitter of transistor 22, which is connected to reference line 21. Thus, the current, $i_v$, passing through resistor 29 varies only as the motor voltage $v_m$ varies, and is very nearly equal to $v_m$ divided by the resistance, $R_{29}$, of resistor 29 ($v_m/R_{29}$). Similarly, the current, $i_i$, passing through resistor 30 is very nearly equal to $v_i$ divided by the resistance $R_{30}$, of resistor 30 ($v_i/R_{30}$), where $v_i$ is the voltage appearing across resistor 30. In turn, $v_i$ is approximately the voltage drop across first current sensing resistor 5. It should be noted that the base current of transistor 22 is small compared to the currents $i_v$ and $i_i$ and may ordinarily be neglected. Thus, the sum of the currents $i_v$ and $i_i$ flows into capacitor 26, affecting the voltage appearing across the capacitor as follows, where $V_c$ = voltage across the capacitor and C = the capacitance of the capacitor 26:

$$V_c = -\frac{1}{C} \int_0^T (i_v + i_i) dt + \text{initial value of } V_c. \tag{8}$$

Note the negative sign, or phase inversion of the integrator. Since the base voltage of transistor 22 is constant, any variation in the voltage across capacitor 26 must be equal to the variation of the collector voltage of transistor 22, so that, where $V_{TC}$ = voltage across the transistor 22 collector and emitter:

$$V_{TC} = -\frac{1}{C} \int_0^T (i_v + i_i) dt + \text{initial value of } V_{TC}. \tag{9}$$

As noted above, $i_i = v_i/R_{30}$ and $i_v = v_m/R_{29}$, where $v_i$ is the voltage appearing across resistor 30. The voltage appearing across resistor 30 is approximately equal to the negative voltage drop across current sensing resistor 5, so that, where $R_5$ is the resistance of resistor 5 and $i$ is the instantaneous motor current:

$$v_i = -i R_5.$$

Substituting equivalent terms gives $$i_i = \frac{-iR_5}{R_{30}}, \text{ and} \tag{10}$$

$$V_{TC} = -\frac{1}{C} \int_0^T \left( \frac{v_m}{R_{29}} - i\frac{R_5}{R_{30}} \right) dt + \tag{11}$$

initial value of $V_{TC}$.

This Equation, with the attendant change in sign due to the phase inversion, is equivalent to Equation 7 above, if the initial condition is neglected and $R_{29}$ is factored out of the integral.

$$V_{TC} = -\frac{1}{CR_{29}} \int_0^T \left( V_m - \frac{R_5 R_{29}}{R_{30}} i \right) dt = -K. \tag{12}$$

As noted before, the value of K is constant only for a given combination of commanded speed and load. It can be recognized that $$R + k\omega = \frac{R_5 R_{29}}{R_{30}}, \text{ so that} \tag{13}$$

$$\omega = \frac{1}{k}\left( \frac{R_5 R_{29}}{R_{30}} - R \right). \tag{14}$$

Thus, the speed of the motor, $\omega$, may be set as desired by selecting appropriate resistance values for $R_5$, $R_{29}$, and $R_{30}$. In fact, any one or more of the resistors 5, 29, or 30 (preferably resistors 29 and/or 30) can be variable resistors for variable speed adjustment, as has been done in FIG. III by making 29 a variable resistor.

Transistor 23 has its collector connected to terminal 25, its base connected to terminal 28, and its emitter connected through resistor 31 to terminal 32. Resistor 33 is connected between line 19 and terminal 32, and capacitor 35 is connected between line 21 and terminal 32.

Unijunction transistor 36 has its emitter connected to terminal 32, its base-two connected through resistor 37 to line 19, and its base-one connected through the primary winding of pulse transformer 38 to reference line 21. In a preferred embodiment (not shown) the unijunction transistor 36 may be replaced by a programmable unijunction transistor (discussed below). Other gating or switching means may, of course be substituted.

Resistor 33, capacitor 35 and unijunction transistor 36 function as a standard ramp-and-pedestal firing circuit as described, for example, in the General Electric *SCR Manual* (5th Edition, 1972), with two significant modifications; first, the input to the ramp and pedestal is the output of the summing amplifier-integrator, rather than a d-c signal, and second, the circuit constants of the ramp generator are typically selected to provide a markedly exponential wave shape. The voltage, $V_{TC}$, transmitted by means of the emitter-follower transistor 23 through current-limiting resistor 31, less one diode voltage drop (emitter-base junction of transistor 23), provides the pedestal voltage to capacitor 35. As a result of the current through resistor 35 continues to charge positively from the quickly-acquired pedestal voltage during each half-cycle. Capacitor 35 charges exponentially toward the voltage of line 19. Diode action in the emitter-base junction of transistor 23 disconnects capacitor 35 from transistor 23, and thus from transistor 22, thereby permitting the voltage of capacitor 35 to rise above the voltage $V_{TC}$. This additional voltage rise is the ramp voltage and it has an exponential wave shape.

As indicated by Equation 7, the motor speed control circuit shown in FIG. III relies on the integration of the difference of two quantities, $v$ and $(R + k\omega)i$. If both quantities are large, a small percentage change in either results in a relatively large change of their difference, whereas if both quantities are small, the identical percentage change in either results in a smaller change of their difference. Thus, the total voltage gain around the control circuit feedback loop (defined according to standard control system terminology) changes with changes in motor voltage. Unless cancelled by a compensating nonlinearity, i.e., gain compensation, this change in total voltage gain will limit the range of motor voltages over which the system can function. Utilization of an exponential type ramp in the ramp-and-pedestal firing circuit provides this necessary gain compensation by introducing the desired nonlinearity such that the voltage transfer function between the pedestal voltage and the average motor voltage is reduced at large pedestal voltage corresponding to large motor voltages.

When the total voltage, pedestal plus ramp, rises above the peak-point (i.e., triggering) voltage of unijunction transistor 36, the transistor 36 fires and discharges capacitor 35 into the primary coil of pulse transformer 38, i.e, the coupling mens. The secondary coil of the transformer 38, which is connected between terminal 14 and terminal 39 (described below), delivers the current pulse thus generated through resistors 40 and 41, to the gates of the SCRs 12 and 13 respectively. Resistors 40 and 41 are connected between the gate of SCR 12 and terminal 39 and the gate of SCR 13 and terminal 39 respectively and serve to insure proper pulse sharing. The SCR which has the more positive anode voltage at the instant the pulse is delivered fires and conducts line voltage to the motor. The two SCRs thus fire alternately at corresponding times of the opposite half-cycles of the applied a-c voltage. Various other coupling means, such as diodes or optical isolators, may be substituted for the pulse transformer.

As explained above, the time (i.e., phase angle) at which the unijunction transistor fires in a given half-cycle and thus the time at which the SCRs fire (i.e., their phase, or fractional conduction time within each half-cycle) is strictly a function of the magnitude of the pedestal voltage, which is a function of the output of the integrator circuit, and which in turn is a function of the motor terminal impedance. Thus, as generally described above, maintenance of the desired motor speed is achieved, regardless of changes in the load applied to the motor, through a closed-loop feedback system, which controls the fractional conduction time, i.e., phase, of the SCRs, and thus the power delivered to the motor by the power modulator circuit.

The conducting SCR remains in is conducting state until the polarity of the applied a-c voltge reverses and the motor current decays to zero (as it will at high speeds for most motors) or until the other SCR fires one-half cycle later (which is the more likely condition with slow speeds).

After capacitor 35 is discharged, the unijunction transistor 36 turns off if the current then flowing from resistors 31 and 33 is sufficiently small. Capacitor 35 begins to charge again quickly to the pedestal voltage. Unijunction transistor 36 may or may not fire again before the end of a given half-cycle, but it does not matter since the SCR remains on so that repeated gate pulses have no effect. However, capacitor 35 must be discharged at the end of every half cycle to begin each new half cycle from the same initial condition. The previously mentioned negative-traveling pulses on line 19 drop the base two voltage of unijunction transistor 36 to zero at the end of every half cycle and cause it to fire and discharge capacitor 35. Note that gate pulses on the SCRs at these times have no effect because neither, then, has a positive anode voltage.

FIG. IV illustrates a preferred embodiment of the invention showing several optional modifications and additions to the more basic motor speed control circuit of FIG. III.

Potentiometer 50 may optionally be added between motor terminal 2 and the reference line 21, with voltage sensing resistor 29 now connected between the variable tap of potentiometer 50 and the summing point, terminal 27. Motor speed adjustment is now conveniently effected by shifting the tap position of 50, and therefore, the fraction of the motor voltage $V_m$, seen by the voltage sensing resistor 29. The current $i_v$ of Equation 8 is now $i_v = \alpha V_m/R_{29}$, where $\alpha V_m$ is the fraction of the motor voltage at the tap position of the voltage divider comprising potentiometer 50.

It may also be desirable to compensate for the generally nonlinear characteristic of motors at very low speeds, wherein the motor current does not decrease linearly toward zero but remains nearly constant at some limiting value, even under no load. The effect of this limiting current is to prematurely fix the lower limit of speed attainable by the control circuit. This effect may perhaps be best understood by reference to FIG. III and to Equation 8, in which it is seen that at low speeds and at the limiting motor current value, as measured by $i_i$, the integrand of the Equation can be maintained at zero only by maintaining $i_v$, the motor voltage sensing current, at a value sufficient to offset $i_i$. Thus, the motor voltage, and hence the motor speed, cannot be reduced below some corresponding limiting value. According to a preferred embodiment of this invention, compensation for this effect may optionally be effected by adding resistor 51 between motor terminal 2 and potentiometer 50 and resistor 52 between the junction of resistor 51 with potentiometer 50 and the full-wave rectified line voltage 17, which thereby applies a small d-c bias to the voltage sensing resistor 29 when the tap of potentiometer is set for slow speeds. With $i_i$ being offset by both the motor voltage and the d-c bias (i.e., $i_v$ measures the sum of these two values), it is possible to reduce the motor voltage, and hence the motor speed, below the otherwise limiting value, thus significantly extending the range of speed control to slower speeds. This addition does not interfere with the motor voltage feedback path. The effect of the d-c bias is gradually eliminated as the tap on potentiometer 50 is advanced to higher speed settings. This is a desirable condition of the circuit, in order to avoid instability at high speed. With this simple addition, a speed range of at least 100:1 has been attained.

As another optional feature, variable potentiometer 53 may be added, as shown, to provide a speed control which can be used on a variety of different sized motors, with a single value of resistor 5. For a given size motor this variable resistor can be omitted, with the first current sensing resistor 5 being selected for optimum performance.

Another optional preferred feature is the addition of diode 54 in series between summing point terminal 27 and the current sensing resistance 30. The voltage drop in this diode can compensate for a nearly equal voltage drop in the base-emitter junction of transistor 22. This compensation tends to prevent small, but sharp, speed rises at no-load conditions where the current feedback signal is small.

According to another optional preferred feature, the second current sensing resistance 30 is split into two components, resistors 30' and 30'', and a diode 55 is connected from the reference line 21 to terminal 56 located between resistors 30' and 30''. The addition of this nonlinear component will partially shunt large current signals while not affecting small signals, and will thus compensate for the tendency for motor speed to increase at heavy loads, as a result of reduced permeability of the magnetic structure of the motor at high current levels, and consequent reduction of the value of $k''$ in Equation 2, which in turn results in a reduction of the value of $k$ and an increase of the value of $\omega$ (speed) in Equation 14.

As another optional preferred feature, the parallel combination of resistor 57 and capacitor 58 may be connected between capacitor 26 and terminal 28. This combination provides a phase-lead which improves the transient response and stability of the speed control system. This feature is particularly desirable where high-inertia loads are involved.

The optional addition of diode 59 and capacitor 60 and the optional use of a programmable unijunction transistor 36', all of which are discussed above with respect to FIG. III, are shown.

As an optional feature to be used when a remote or automatic control is preferred to manual or other adjustment of potentiometer 50, optical isolator 61 may be added as shown, with or without retention of potentiometer 50. The optical isolator may typically consist of a well-known combination of a photoconductive resistor and a variable light source which illuminates the photoconductive resistor. The light source is controlled by the remote or automatic signal, and the light in turn controls the resistance value of the photoconductor, which in turn controls the motor speed in a manner similar to that which has been previously discussed. Many variations of this technique are possible using many types of remotely-variable resistance or current source or voltage source.

Another optional preferred feature is the addition of capacitor 62 as shown, through which an initial charge may be placed on capacitor 26 when the system is initially turned on. This eliminates delay at turn on and is a desirable feature in applications requiring frequent starts and stops.

The above-described preferred embodiments constitute optional features of the present invention which may be used in combination as desired.

While the circuit components utilized in any particular application will vary depending upon the requirements, typical component values for one particular control circuit are shown in FIG. IV for illustrative purposes only.

FIG. V presents speed-torque data obtained with a 2-ampere universal series gear motor using one embodiment of the control circuit of the present invention. The specific control circuit utilized was identical to the circuit shown in FIG. IV except for the following minor changes, additions, or deletions: (1) capacitor 62 and optical isolator 61 were deleted; (2) the junction of capacitor 58 and resistor 57 was connected to the emitter of transistor 23, rather than to the collector of transistor 22, and a load resistor was connected between the emitter of transistor 23 and line 21; this change provided feedback over the entire summing amplifier for increased stability; (3) since the above change, (2), eliminated the diode action of the emitter-base junction of transistor 23 in permitting the ramp voltage of capacitor 35 to rise above voltage $V_{TC}$, a diode was inserted between the emitter of transistor 23 and resistor 31; (4) to assist in gating the programmable unijunction transistor (PUT) 36' into the nonconducting state, a transistor was connected between the PUT anode terminal 32 and line 21 so that the transistor could be switched into the conducting state when the PUT fired; the primary of the pulse transformer 38 was then inserted between capacitor 35 and line 21 so that, when the transistor was conducting, the anode voltage of the PUT was brought rapidly to a very low value, thereby gating the PUT into the nonconducting state; (5) a small capacitor was connected from the base to the collector of transistor 22 for the purpose of reducing the gain of the integrator-amplifier feedback loop at high frequencies, thereby reducing any tendency toward circuit instability due to oscillation, and reducing the transmission of high-frequency noise. All of the above changes, additions, or deletions are of a purely optional nature.

FIG. V effectively illustrates the flatness of the speed-torque curves (within about 5%) over the full range from no load to rated torque (55 in. lbs.) and over a speed range of better than 40 to 1 (175 rpm to 4 rpm) at rated torque. In fact, the motor did not stall at the 12 rpm no-load setting with 135 in. lbs. applied torque (nearly 2.5 times rated torque), and at light loads the control range was approximately 100 to 1.

It is understood that although the present invention has been specifically disclosed by preferred embodiments and optional features, modification and variation of the concepts herein disclosed may be resorted to by those skilled in the art, and such modifications and variations are considered to be within the scope of this invention as defined by the appended claims.

I claim:

1. A motor speed control system for a universaltype electric motor comprising:
   a. a power modulator circuit having a pair of input terminals adapted to be connected to a source of alternating current and a pair of output terminals adapted to be connected to a universal-type motor, said circuit including gating means adapted to control the power supplied to the motor;
   b. means, adapted to be connected in series between the motor and one of said output terminals and adapted to provide a voltage which is directly proportional to the instantaneous motor terminal current;
   c. means, connected to means (b) at said output terminal, adapted to provide a sensing current which is directly proportional to the voltage across means (b), and thus to the instantaneous motor terminal current;
   d. means, adapted to be connected to the motor and adapted to provide a sensing current which is directly proportional to the instantaneous motor terminal voltage;
   e. summing means, connected to means (c) and (d), adapted to algebraically sum the instantaneous values of the two sensing currents;
   f. integrator means, connected to means (e), adapted to average the sum of instantaneous values provided by means (e); and,
   g. feedback means, connected between integrator means (f) and said gating means and adapted to generate a signal for operating the gating means, said signal having a phase determined by the output of the integrator means, whereby the output of the integrator means controls the phase of the gating means and thereby controls the power supplied to the motor.

2. A system as in claim 1 wherein means (b) includes current transformer means.

3. A system as in claim 1 wherein means (b), (c), and (d) each comprise a resistance means.

4. A system as in claim 3, wherein means (c) comprises potentiometer means connected to means (b) and resistance means connected to the tap of the potentiometer.

5. A system as in claim 3, wherein means (d) comprises potentiometer means adapted to be connected to the motor, and resistance means connected to the tap of the potentiometer.

6. A system as in claim 3 wherein summing means (e) comprises a summing amplifier, and integrator means (f) comprises an integrating amplifier.

7. A system as in claim 3 wherein summing means (e) and integrator means (f) comprise a single summing amplifier which operates in the integrating mode.

8. A system as in claim 7 wherein power modulator circuit (a) comprises a controlled bridge rectifier circuit.

9. A system as in claim 8 wherein the controlled bridge rectifier circuit comprises two thyristor means and two diode means in combination.

10. A system as in claim 9 wherein the two thyristor means function as the gating means.

11. A system as in claim 10 wherein the feedback means (g) comprises ramp-and-pedestal trigger means connected to the integrator output, said trigger means including unijunction transistor means, and pulse transformer means connected between the output of the trigger means and the gate of the gating means, wherein the ramp-and-pedestal trigger means, including the firing of the unijunction transistor, is responsive to the integrator output, and wherein the firing of the unijunction transistor means causes the generation of pulse signals by the pulse transformer, with said pulse signals serving to open the gating means into the conducting state.

12. A system as in claim 11 wherein the ramp-and-pedestal trigger means is of the exponential ramp type.

13. A system as in claim 12 wherein the unijunction transistor means comprises a programmable unijunction transistor.

14. A system as in claim 12, including resistance means connected between the gate of one thyristor means and one of the pulse transformer output terminals, and resistance means connected between the gate of another thyristor means and said output terminal, wherein said two resistance means insure proper pulse sharing between the thyristors.

15. A system as in claim 1, including full wave rectifier means adapted to be connected to the alternating current source, wherein said rectifier means is adapted to provide d-c voltage to means (e), (f), and (g).

16. A system as in claim 15 including resistance means and zener diode means connected in series to the rectifier means, wherein said resistance means and zener diode means are adapted to provide at least partially filtered and regulated d-c voltage to means (e), (f), and (g).

17. A system as in claim 5, including first resistance means adapted to be connected between the motor and the potentiometer and second resistance means connected between the junction of the first resistance means with the potentiometer and a rectified a-c voltage source, with the second resistance means adapted to provide a d-c bias to means (d).

18. A system as in claim 1, including diode means connected in series between means (c) and means (e) and adapted to provide a voltage drop to compensate for the voltage drop at the input of the summing means (e).

19. A system as in claim 3, wherein means (c) comprises at least two resistor means with diode means connected between the junction of the two resistors and a virtual ground.

20. A system as in claim 1, including phase-lead means inserted in series with the integrating capacitor of integrator means (f), with the phase-lead means comprising capacitor and resistor means in parallel.

21. A system as in claim 16, including series diode means and parallel capacitor means inserted between said zener diode regulated supply voltage and means (e), whereby the voltage supplied to means (e) is further filtered.

22. A system as in claim 1, wherein means (d) comprises optical isolator means.

23. A system as in claim 1, including capacitor means adapted to be connected between a d-c voltage source and the capacitor of said integrator means (f) and adapted to provide a positive transient charge to the integrator means.

24. A method of controlling the speed of universal-type electrical motors powered through power modulator means having gating means adapted to control the power supplied, comprising:
   a. providing a sensing current directly proportional to the instantaneous motor terminal current;
   b. providing a sensing current directly proportional to the instantaneous motor terminal voltage;
   c. averaging the instantaneous values of the two sensing currents;
   d. measuring the ratio of average motor terminal voltage to average motor terminal current using the averages obtained in step (c);
   e. generating a negative feedback signal adapted to open the gating means of the power modulator, wherein the negative feedback signal has a phase determined by the value of the ratio obtained in step (d), whereby the value of the ratio controls the phase of the gating means and thereby controls the power supplied to the motor.

25. A method of controlling the speed of universal-type electric motors powered through power modulator means having gating means adapted to control the power supplied, comprising:
   a. providing a sensing current directly proportional to the instantaneous motor terminal current;
   b. providing a sensing current directly proportional to the instantaneous motor terminal voltage;
   c. algebraically summing the instantaneous values of the two sensing currents;
   d. averaging the sum of instantaneous values obtained in step (c);
   e. generating a negative feedback signal adapted to operate the gating means of the power modulator, wherein the negative feedback signal has its phase determined by the magnitude of the average obtained in step (d), whereby the magnitude of the average controls the phase of the gating means and thereby controls the power supplied to the motor.

26. A method as in claim 25, including providing gain compensation to the feedback signal, whereby any excessive feedback signal is corrected.

* * * * *